United States Patent [19]

Crawford et al.

[11] Patent Number: 5,099,600
[45] Date of Patent: Mar. 31, 1992

[54] PARAFFIN WAX GRAFTING TECHNIQUE AND APPARATUS

[75] Inventors: Willie D. Crawford, Riverside; Bill Jacobs, Livingston, both of Tex.

[73] Assignee: Champion International Corporation

[21] Appl. No.: 297,582

[22] Filed: Jan. 17, 1989

[51] Int. Cl.$^5$ .................................................. A01G 1/00
[52] U.S. Cl. .................................................. 47/6; 47/7
[58] Field of Search .......................................... 47/6, 7

[56] References Cited

U.S. PATENT DOCUMENTS 3,050,905  8/1962  Vlaeminck .................................. 47/6
4,524,541  6/1985  Geiges ........................................ 47/58

FOREIGN PATENT DOCUMENTS 969201  10/1982  U.S.S.R. .................................... 47/6

OTHER PUBLICATIONS

Plant Propagation Practices by James S. Wells, ®1985 American Nurseryman Publishing Co. Inc., pp. 172, 173.
Grafting and Budding by Charles Baltet, ®1882, pp. 6-9, 38-41, 74-81, 90-95 and 100-103.
Plant Propagation by Hartmann and Kester second edition, ®1968 by Prentice-Hall Inc., pp. 396-399, 402-413, 426-429.

Primary Examiner—Henry E. Raduazo
Attorney, Agent, or Firm—Evelyn M. Sommer

[57] ABSTRACT

A technique and equipment for grafting are disclosed. The technique involves forming a wedge on a scion, forming a cleft or side cut in rootstock, forming a union with the scion and rootstock, binding the union with budding strips, and coating the wrapped union with liquid paraffin wax. Clothespin type clamps are advantageously employed to releasably close the cleft, prior to forming the union, and for securing the union during binding. Grafting tools are provided in a grafting tool kit and include a knife, budding strips, paraffin wax, a brush, a metal cup, hand pruners, whet rocks and honing oil, alcohol and paper towels, and clothespins. The paraffin wax is applied to the bound union in a clear liquid state at 175°–200° F., and preferably at an ambient temperature of at least 38° F. and less than 15 mph winds. The paraffin wax is heated in the metal cup by a stove in region of reduced temperature which is established by a J/C Grafting Adaptor having a standoff element and a platform adapted in use for being assembled to the stove.

10 Claims, 4 Drawing Sheets

PARAFFIN WAX GRAFTING TECHNIQUE AND APPARATUS

This invention relates to plant, especially tree, grafting techniques and equipment therefor.

BACKGROUND OF THE INVENTION

Tree grafting techniques traditionally involve forming a union between a succulent sicon having a wedge shaped base portion and stock having a cleft, succulent end portion. The scion is inserted into the cleft of the stock, with care being given to the alignment of respective growth layers. A binding, such as a rubber grafting band, is applied evenly along the full length of the union to prevent the formation of resin pockets between the cut surfaces. Also, when the contacting surfaces are uneven and not under pressure, air-filled clefts form between stock and scion. The correct binding, and the application of an even pressure along the full length of the union is of great importance during the knitting of the union. The binding is coated with grafting wax, typically beeswax, to seal the union. Beeswax can be messy and cumbersome to work with. Further steps include covering the graft with a plastic bag so that the graft can develop in an airtight environment. For field grafting, the plastic bag may be covered with a kraft paper bag provided with holes for ventilation on the north side of the bag.

Such grafts as have been described require a high degree of post-graft care. A minimum of 3-5 cruises through each orchard are required to release bag grafts, with a good deal of time and expense incurred.

Furthermore, birds often damage grafts covered with foil or plastic bags.

Furthermore, a low graft survival rate requires replanting expensive rootstock that takes time to develop to grafting size. The time and effort involved to reestablish rootstock for grafts lost is very expensive.

SUMMARY OF THE INVENTION

Therefore, it is an object of this invention to provide a grafting technique that is less labor intensive, especially in terms of post-graft care.

It is an additional object of this invention to provide a grafting technique that results in a high survival rate.

It is an additional object of this invention to provide a grafting technique that is best suited to grafting dormant scions and/or stock.

It is a further object of this invention to provide a tool kit that is well suited to field grafting.

It is yet a further object of this invention to provide a special tool that is particularly well adapted for use with the grafting technique of this invention.

According to this invention, the union between a scion and stock is bound with budding strips, or the like, and covered with a thin layer of heated paraffin wax. The grafts are made with dormant, rather than succulent, scions and stock.

As grafts mature, new layers or buds emerge through the thin layer of paraffin wax. There is nothing more natural. If budding strips are used to bind the scion and rootstock together, they will need to be loosened or cut off as new leaves form on the successful graft. The paraffin covering prevents the budding strips from decomposing naturally.

According to an aspect of the invention a tool kit is provided, especially suited to field grafting, and includes a knife, grafting tape, paraffin wax, a brush, wire, I.D. tags, a cup, a whet stone, alcohol, paper towels, a bag for storing scions, pruners and clothespins.

According to a further aspect of the invention a specialized tool, which may be in kit form, is provided to adapt to portable backpack type stove in order to provide a region of reduced temperature in contrast to a region immediately adjacent a burner surface of the stove. This is essential for maintaining the paraffin wax at a preferred temperature of 175°-200° F.

Other objects, features and advantages of the invention will become apparent in light of the following description thereof.

BRIEF DESCRIPTION OF THE DRAWINGS

FIG. 1 is a perspective view of a scion and stock prepared for grafting according to the invention;

FIG. 2 is a perspective view of the scion and stock of FIG. 1 forming a union in an intermediate step in the grafting process of this invention;

FIG. 3 is a perspective view of the union of FIG. 2 is a further step in the grafting process of this invention;

FIG. 4 is a perspective view of the union of FIG. 3 in a further step in the grafting process of this invention;

DETAILED DESCRIPTION OF THE INVENTION

Grafting Technique

Figure 1:
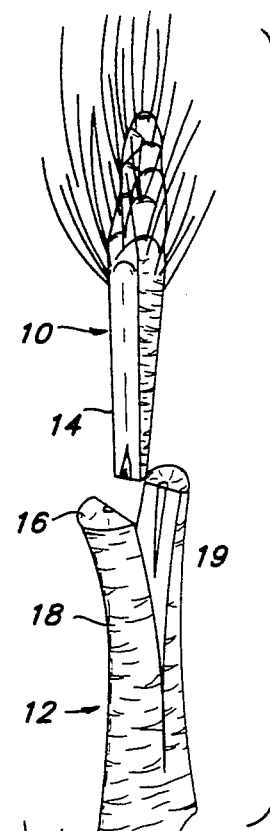
FIGS. 1 through 4 are illustrative of the steps involved in the grafting technique of this invention.
Figure 5:
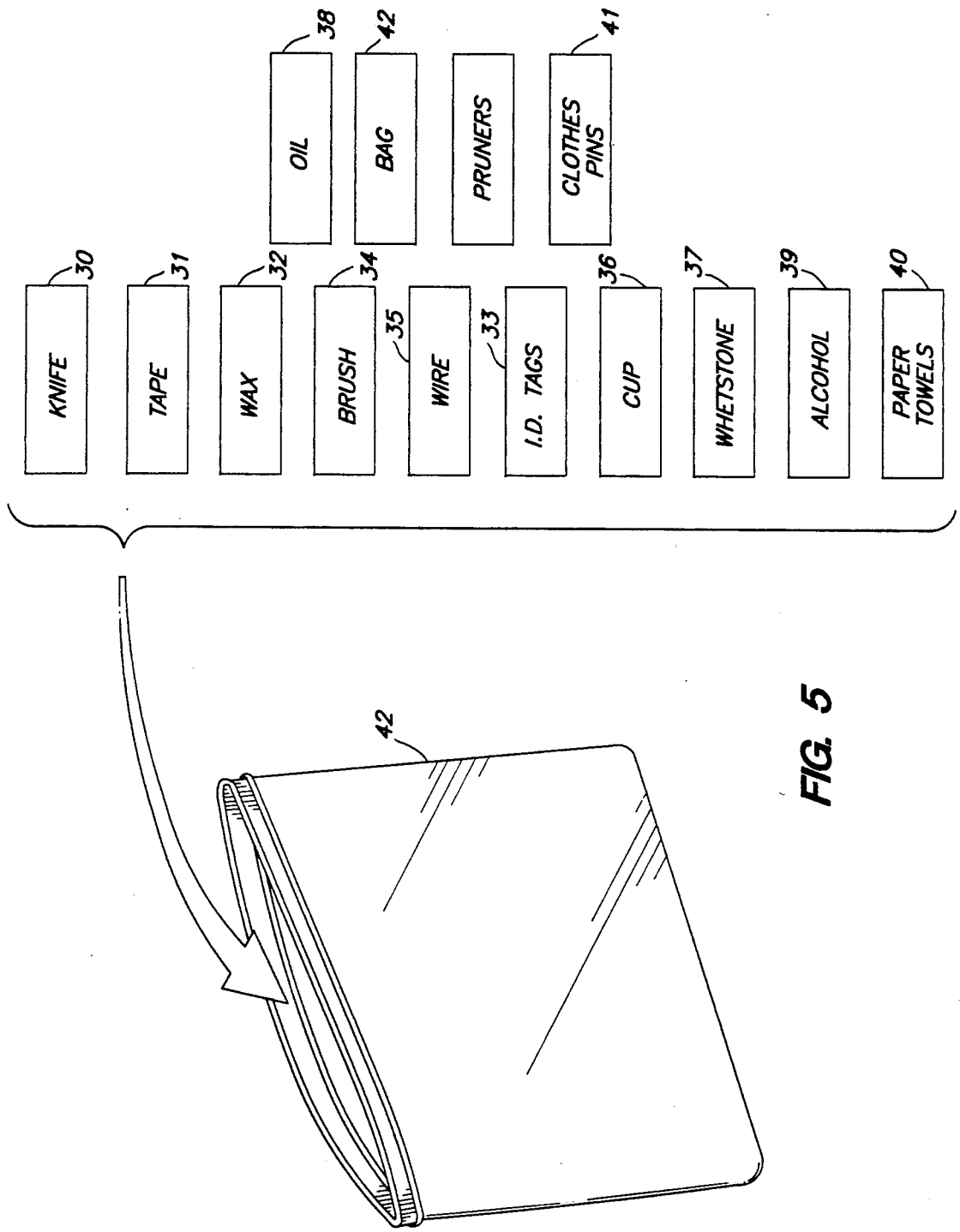
FIG. 5 is a view, partially in block diagram form and partially in perspective, of the tool kit of this invention.

FIG. 1 shows a scion 10 and stock, such as rootstock 12, prepared for grafting. Generally, a base portion 14 of the scion is cut, such as with a knife (shown in FIG. 5), to form a flat, wedge, typically on the order of 1¼ inches long. The stock 12 is topped, such as with pruning shears (shown in FIG. 5), to form an end surface 16. The knife is then forced into the end surface 16 of the stock to split, or bifurcate, an end region 18 of the stock 12, thereby forming a cleft 19 in the end region. The cleft should be at least as deep, preferably deeper, than the wedge.

More particularly, while holding rootstock 12 for support, make a three inch (if there is adequate room) vertical cut beginning just below the terminal bud (end surface 16) down into the rootstock pith. A slightly longer incision into the rootstock prevents a large bulge of the scion from being forced into too short a cleft space. Close this cut (cleft 19), such as with a clothespin (shown in FIG. 5), to prevent rootstock desiccation.

In conifers, carefully remove all fascicle bundles and needles from the scion 10. With the back of the grafting back of the grafting knife (shown in FIG. 5), gently scrape off remaining needle parts. Dip terminal bud of scion into heated paraffin wax cup (shown in FIG. 5). The paraffin must be hot enough to go on clear like water.

Beginning just below the scion terminal bud, make a vertical cut on both sides of the scion to form a wedge 14, with cambium layers exposed. Remove clothespin from rootstock, insert scion into rootstock cut, being sure to match the cambium layers of the scion to rootstock on a minimum of one side.

It is preferable to select a scion that is equal to or a little larger in diameter to the size of the rootstock being grafted. Scions become smaller after removal of needles and fascicle sheaths.

It is also important that the rootstock and scions must be healthy, vigorous, disease and insect free. This applies to all scion and rootstock plants.

Figure 2:
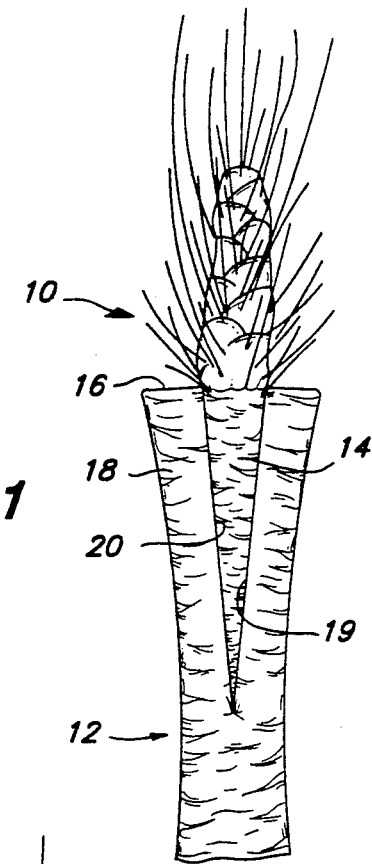

FIG. 2 shows the scion wedge 14 inserted into the rootstock cleft 19 to form a union 20. At this stage in the grafting process, it is advantageous to clamp the union 20, such as with the wooden clothespin (shown in FIG. 5), to prevent graft desiccation and scion movement.

Figure 3:
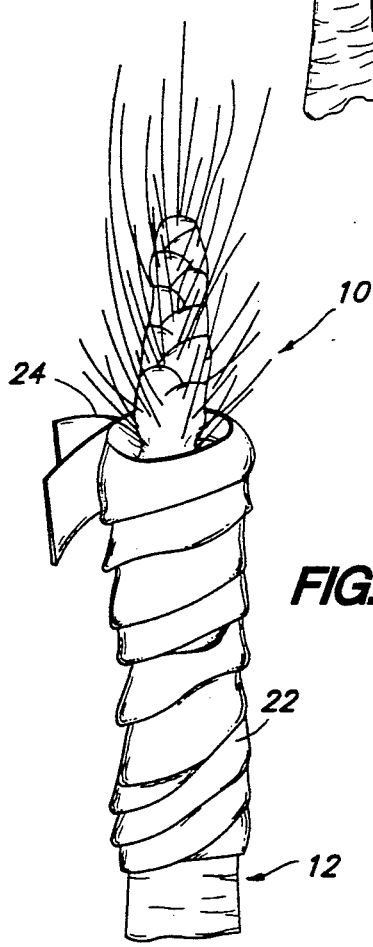

FIG. 3 shows a further step in the grafting process of this invention. The union 20 is tightly wrapped with budding strips (also shown in FIG. 5), so as to completely cover any otherwise exposed portion of the graft union. The budding strips are preferably wrapped from the bottom up (i.e., from stock towards scion), and is wrapped in an overlapping spiral pattern. While wrapping the union, it is important to securely hold the rootstock to prevent scion and rootstock twist. At the completion of the wrap, in other words, at the top of the union, the budding strip is secured, preferably with a half-hitch knot 24. At all times during wrapping the union, it is important not to pull the budding strip too tightly, else the union may become girdled.

Figure 4:
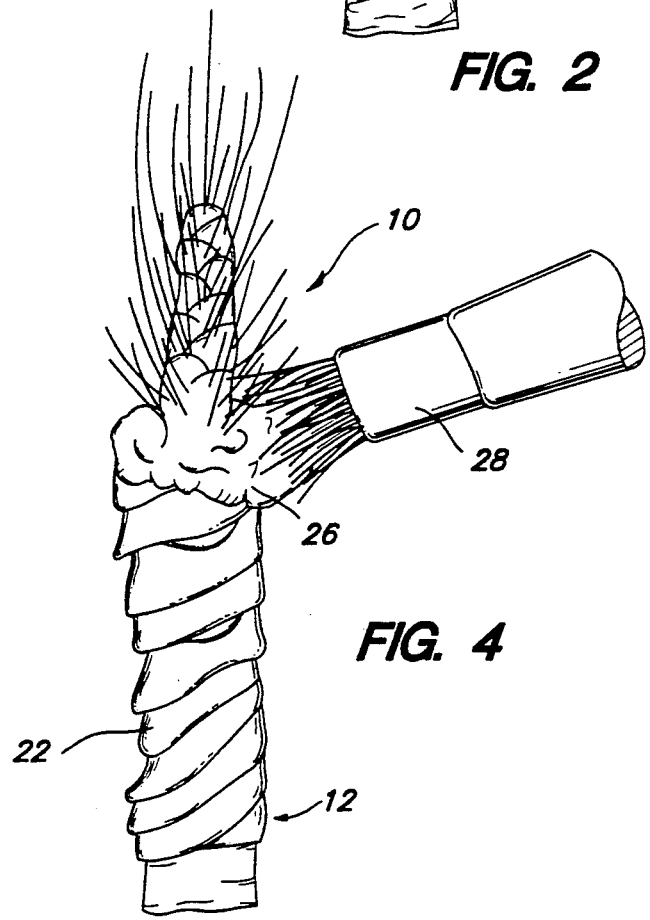

FIG. 4 shows the wrapped union of FIG. 3 being coated with a thin layer of paraffin wax 26. This is a very important step in the grafting process of this invention. Preliminary to this step, a block of paraffin wax (shown in FIG. 5) is heated to a clear liquid state. Equipment suitable for heating the paraffin wax, especially in the field, is shown in FIGS. 6 and FIGS. 7A-7E.

Returning to FIG. 4, using a bristle brush 28 (also shown in FIG. 5) the wrapped graft union is covered with a clear coating of wax, preferably by allowing the wax to flow from the brush over the scion and budding strip. If desired, an identification (I.D.) tag (shown in FIG. 5) may be applied to the graft at this point.

The paraffin wax must be maintained at a constant temperature of between 175°-200° F. for application to the union. Although a thermometer may be used to determine the wax temperature, the ideal temperature will vary somewhat with ambient conditions (temperature and pressure), and a more empirical approach can be employed. Simply put, the wax is too cold if it is tacky or white. A clear liquid state is important to maintain, especially when several grafts are to be performed over several hours. Apparatus is shown in FIGS. 6 and 7A-7E which is best suited to this task, and will be described in greater detail hereinafter.

The weather is extremely critical in field grafting success. If the ambient temperatures falls below 35°-38° F., grafting should be halted. This temperature range may be altered by wind direction, wind speed, and cloudiness. If the wind exceeds 15 mph grafting success may go down. Shielding the graft from the wind as you make necessary cuts can help prevent graft desiccation. As a rule of thumb, graft fresh dormant scions onto rootstock 1-4 weeks prior to bud break; immediately before if possible for best results with dormant scions. Make sure the paraffin goes on clear.

In experimental tests of the grafting technique of this invention, several thousand grafts have been made by the paraffin grafting method with an annual average survival rate in excess of 90%. In individual sample batches, survival rates approaching 100% have been obtained. In comparison, several thousand plastic bag/paper bag grafts have averaged 67% survival annually. Paraffin wax grafting averaged 25% better survival annually, at about one-fourth of the final cost. All grafts were made in the field at 30'×30' spacing.

Additionally, with the paraffin wax graft technique of this invention, post-graft care is virtually eliminated.

It has also been found that, with the present inventive technique, orchards are established 75% sooner with flower production moved forward by 2-3 years due to increased graft survival.

Paraffin wax grafting efficiency is attributable largely to the virtual elimination of post-graft care. Except for loosing budding strips, etc., grafts mature naturally and elongate through the paraffin when ready, no bags or foil to inspect and remove. If bags or foil covers are released too soon, grafts can desiccate and tender foliage can be killed.

It has been found that bed grafts can also be done faster and also more efficiently. Paraffin wax grafting works equally well on fruit, nut and citrus plants. With the exception of after care to prune back rootstock, tally grafts, and loosen budding strips (if used), post-graft care using praffin wax is eliminated. Heated paraffin wax covered grafts mature naturally, and graft burn to early release is eliminated.

The paraffin wax grafting technique of this invention can be successfully utilized on any type of hardwood or conifer dormant grafts. The technique was developed primarily for southern conifers but can be modified to cover all species.

Tool Kit

The following tools are used to perform the graft of this invention. Some are more applicable to field grafting than to bed grafting:

a) Sharp grafting knife 30.

b) 8 inch×⅜ inch degradable rubber budding strips 31. (May prefer tacks, grafting tape, etc.)

c) Paraffin wax 32, shown melted as 26 in FIG. 4 (Gulf Brand works well). Keep wax clean and free of debris.

d) I.D. tags 33 where applicable.

e) ¾ inch Prager pure bristle artist brush 34 (attach small copper wire 35 to keep brush off bottom of wax cup 36).

f) A one-cup size aluminum measuring cup 36.

g) Medium hard-hard whet rocks 37 and honing oil 38 for sharpening knife.

h) Alcohol 39 and paper towels 40 for sanitation.

i) Wooden clothespins 41, mentioned hereinbefore for holding scion and rootstock together while wrapping together.

The preceding items 30-41 all fit nicely in a bag 42. The following items, not shown, are also useful in performing grafts. A nail apron works well to carry budding strips, tags, extra paraffin, etc. to field. Hand pruners are a necessity.

Figure 6:
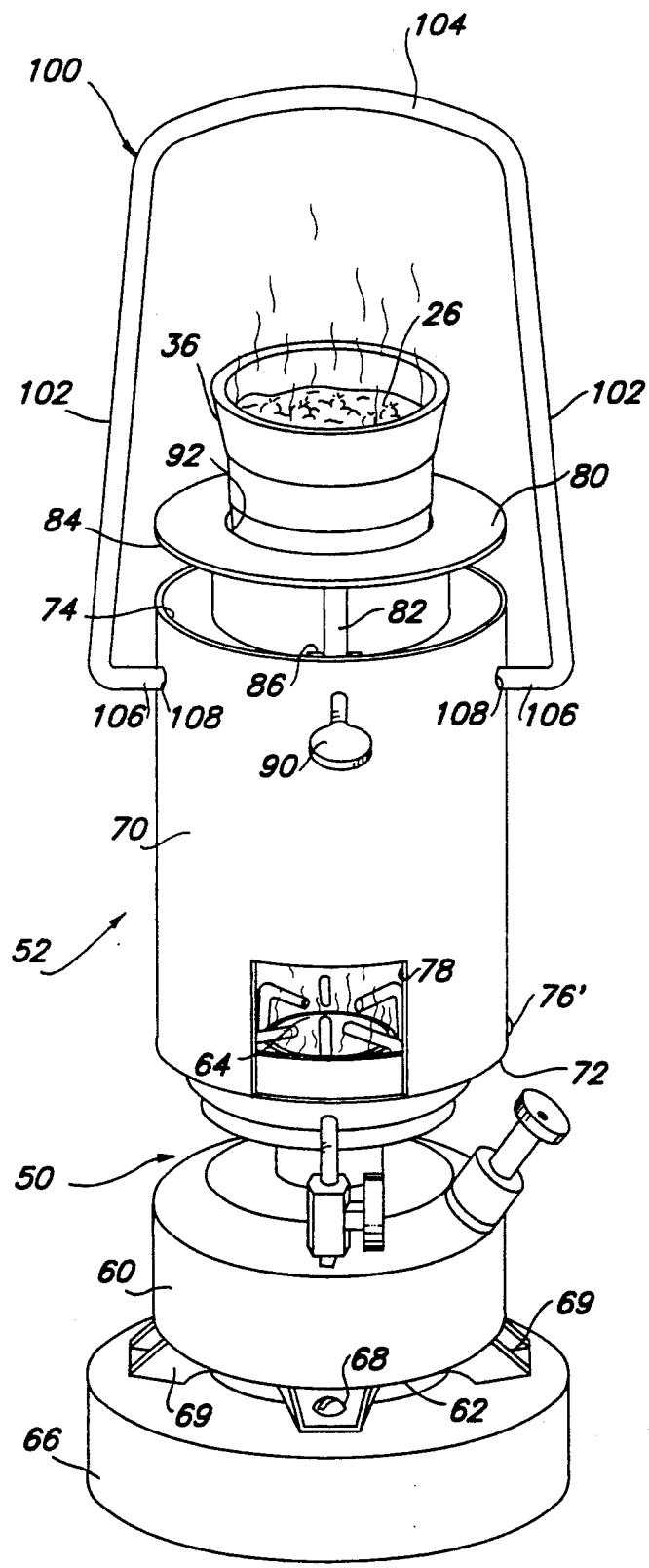
FIG. 6 is a view of the "J/C Grafting Adaptor" in use on a backpack stove.

FIG. 6 shows a stove 50, J/C Grafting Adaptor 52 (described in greater detail hereinafter) and a cup 36, for melting the wax 32. In the field, a reliable, portable, stove, such as a backpack stove, is required to heat the paraffin wax. It is advantageous if a multifuel stove is employed. A suitable stove is the Peak One marketed by Coleman. This stove will simmer for several hours. The paraffin wax is heated, preferably with the apparatus disclosed hereinafter, and should reach a temperature of 175°-200° F. before grafting dormant cuttings. A candy thermometer (not shown) can be used to check paraffin temperature for accuracy. Depending on ambient temperature, paraffin wax must be clear when brushing onto scion and rootstock with the bristle brush. The paraffin cup may be lowered or raised via the J/C Grafting Adaptor 52 to maintain the correct temperature range. It is preferable to keep the paraffin cup at ¾ full. A plastic bag (not shown) may also be provided to fit folded within the enclosure bag 42 for carrying scions.

J/C Grafting Adaptor

Figure 7:
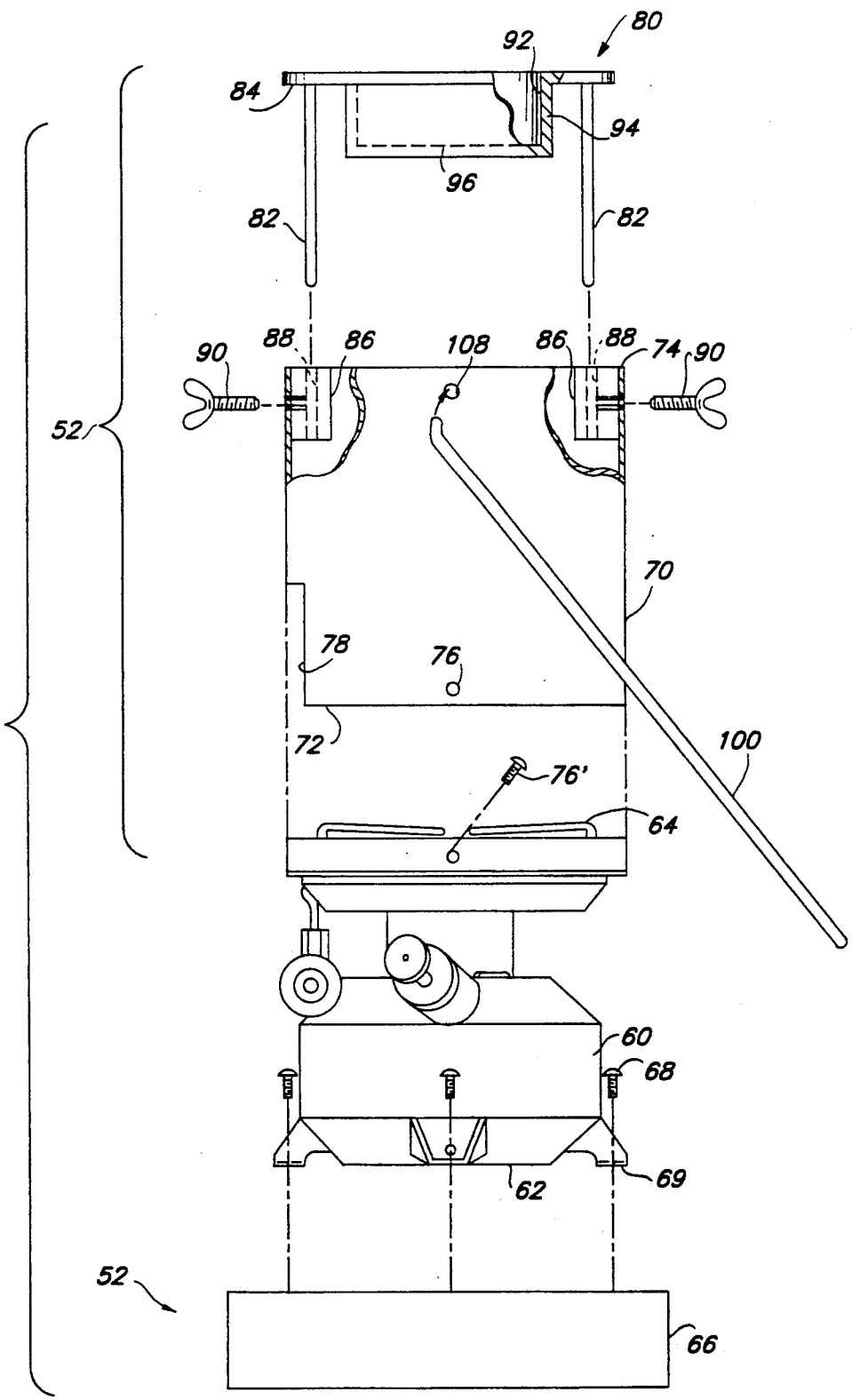
FIG. 7 is an exploded view of the J/C Grafting Adaptor on a backpack stove.

In addition to the tools mentioned above, a J/C Grafting Adaptor (spacer) 52 has been created for fitting to the stove. The adaptor spaces the aluminum cup 36 away from the burner surface of the stove 50, making it easier to maintain the rather moderate (175°-200° F.) temperature required to maintain the paraffin wax in a clear, liquid state without boiling. FIG. 7 shows the adaptor kit 52.

FIG. 7 shows the Coleman Peak One multifuel stove 60 (50 in FIG. 6). The stove has a base 62 and a burner surface 64. The stove 60 is conveniently mounted to a base plate 66 via three screws 68 inserted through three corresponding lugs 69 on the base 62 of the stove. The base plate 66 can be a block of wood, circular in plan section (not shown), or can be formed as a one-ended cylinder of sheet metal, such as of 14 gauge steel. The J/C Grafting Adaptor, described more particularly with respect to FIG. 7 is adapted in use for being assembled to a backpack type stove 60 for providing a region of reduced temperature in contrast to a region of higher temperature immediately adjacent the burner surface 64 of the stove 60.

FIG. 7 shows a tubular standoff element 70, which may be formed of mild steel, stainless steel or aluminum. The standoff element 70 is cylindrical and has two open ends 72 and 74. Typical dimensions for the standoff element 70 are 4½ inches in diameter and 5 inches long. The diameter is chosen such that the one end 72 of the standoff element 70 is readily affixed to a peripheral portion of the burner surface of the stove. To this end a small hole 76 is provided in the standoff element 70 to accept a screw 76'.

The standoff element 70 further includes vent means, such as an opening 78 in the surface of the standoff element 70, for admitting air to the burner of the stove and for allowing heat from the stove to be directed away from the region of reduced temperature at the opposite end 74 of the standoff element. The opening 78 is preferably adjacent the one end of the standoff element 70. A suitable dimension for the opening 78 is two inches around the circumference of the standoff element and two inches high.

The J/C Grafting Adaptor also includes a platform 80 for receiving an element, such as the cup 36, to be heated by the stove in the region of reduced temperature adjacent the opposite end 74 of the standoff element 70. The platform is generally a flat circular metal plate of similar diameter as the standoff element 70, and is adjustably fitted to the opposite end 74 of the standoff element 70 in the following manner.

Two parallel legs 82 extend from a bottom surface 84 of the platform at diametrically opposed points near its periphery. The legs 82 may be formed of ¼ inch round metallic stock, 4⅛ inches long, and brazed to the bottom surface of the platform. The standoff element 70 includes two cinch blocks 86 disposed at diametrically opposed positions about the opposite end 74 of the standoff element 70. The blocks 86 are provided with holes 88 therethrough for receiving axially the platform legs 82, and are provided with set screws 90 extending perpendicularly from exterior the blocks 86 to the holes 88 therein to releasably retain the legs 82 in a range of positions whereby the spacing between the platform and the opposite whereby the spacing between the platform and the opposite end 74 of the J/C Grafting Adaptor element can be varied to adjust the temperature in the region of the platform 80. As shown, the blocks 86 can be disposed on the interior surface the opposite end 74 of the standoff element 70, in which case the set screws 90 extend through the surface of the standoff element 70 into the holes 88. However, the blocks, or clamp means, could be disposed on the exterior surface of the standoff element 70, in which case the diameter of the platform 80 would need to be larger than the diameter of the standoff element 70.

The platform 80 is provided with a central hole 92 for receiving the cup 26. Preferably the cup is tapered, for instance from an outside diameter of 1¾ inches at its base to 3 inches at its opening, in which case a suitable dimension for the platform hole 92 would be 2¾ inches. Means other than the hole 92 could be provided to receive other elements to be heated in the region of reduced temperature defined by the platform 80 as spaced from the opposite end of the standoff element 70. A cylindrical metal sleeve 94 extends downward from the hole 92, about one inch, and may have a bottom, as indicated by the dashed line 96.

The J/C Grafting Adaptor also includes a handle 100, preferably of metal, adapted to be fitted to the tabular standoff element 70. The handle 100 is generally U-shaped, having two legs 102 and a central bight portion 104. An end portion 106 of each leg 102 is bent inwardly, towards a similar end portion of the other legs. These end portions 106 are suitably dimensioned to engage by resiliently separation and elastic behavior two diametrically opposed holes 108 in the surface of the standoff element 70. Preferably, the holes 108 are adjacent, such as ½ inch from the opposite end 72 of the standoff element. Conveniently, the handle-receiving holes 108 in the standoff element 70 are offset circumferentially, preferably symmetrically, from the platform leg receiving clamping blocks 86. A suitable dimension for the handle is 10½ inches long, when bent, and a suitable material is ¼ inches brass round stock. The ends 106 should extend into the holes 108 approximately ½ to ¾ inches so that the handle does not inadvertently come undone.

What is claimed is:

1. A method of forming a viable union between a scion and stock comprising:
   a) preparing (forming) a base portion of the scion into a wedge;
   b) cutting a cleft in a region of the stock;
   c) inserting the wedge portion of the scion into the cleft of the stock to form a union;
   d) binding the union with budding strips;
   e) heating paraffin wax to a temperature at which it becomes clear liquid, between substantially 175° F. and substantially 200° F.;
   f) coating the wrapped union with the clear liquid paraffin wax; and g) in the intervening time interval between cutting the cleft (step b) and forming the union (step c), releasably closing the cleft.

2. A method according to claim 1 wherein the cleft is closed with a clothespin type clamp.

3. A method according to claim 1 further comprising ensuring that the cambium layers of the scion and stock are aligned on at least one side of the union.

4. A method according to claim 1 wherein the cleft in the stock is deeper than the wedge portion of the scion.

5. A method according to claim 1 wherein the paraffin wax is heated (step e) to a temperature of 175°–200° F.

6. A method according to claim 1 wherein the paraffin wax is heated (step e) with a portable, backpack type stove.

7. A method according to claim 7 wherein the stove is equipped with a J/C Grafting Adaptor for establishing a region of decreased temperature as compared to a region of higher temperature immediately adjacent a burner surface of the stove.

8. A method according to claim 1 wherein the union is formed at an ambient temperature of at least 38° F. and in less than 15 mph winds.

9. The method of forming a viable union between a scion and stock of claim 1 wherein said region is an end region.

10. The method of forming a viable union between a scion and stock of claim 1 wherein said region is a side region.

* * * * *